US005855073A

United States Patent [19]

Boelling

[11] Patent Number: 5,855,073

[45] Date of Patent: Jan. 5, 1999

[54] WORKPIECE POSITIONING TOOL AND METHOD USING SAME

[76] Inventor: James E. Boelling, 1223 SE. Emma, Des Moines, Iowa 50315

[21] Appl. No.: 530,765

[22] Filed: Sep. 19, 1995

[51] Int. Cl.[6] ..... G01B 5/25

[52] U.S. Cl. ..... 33/533; 33/474; 33/613; 52/127.2; 248/235

[58] Field of Search ..... 248/220.1, 221.1, 248/235, 243, 250, 205.3; 108/180, 192, 193; 33/645, 533, 474, 481, 613, 646, 648; 52/562, 127.2, 127.5; 269/41, 242

[56] References Cited

U.S. PATENT DOCUMENTS

| | | | |
|---|---|---|---|
| 591,664 | 10/1897 | Badanes | 248/235 |
| 863,068 | 8/1907 | Huff | 248/243 |
| 3,137,492 | 6/1964 | Dussold | 269/41 |
| 3,276,128 | 10/1966 | Ponich | 33/613 |
| 3,400,847 | 9/1968 | Stute | 248/205.3 |
| 3,966,056 | 6/1976 | Larson | 248/220.1 |
| 4,708,310 | 11/1987 | Smith | 248/220.1 |
| 4,709,527 | 12/1987 | Cooley | 52/749 |
| 4,762,081 | 8/1988 | Porter | 248/235 |
| 4,805,860 | 2/1989 | Holmstrom | 248/220.1 |
| 5,297,486 | 3/1994 | Herrmann | 248/250 |
| 5,312,078 | 5/1994 | Marsh | 248/220.1 |
| 5,573,228 | 11/1996 | Chestnut | 269/41 |

OTHER PUBLICATIONS

PCT WO 94/23613; Shelf Support, Oct. 1994.

*Primary Examiner*—Leslie A. Braun
*Assistant Examiner*—Gwendolyn Baxter
*Attorney, Agent, or Firm*—Zarley, McKee, Thomte, Voorhees & Sease

[57] ABSTRACT

An L-shaped positioning tool is I-shaped in cross section, including inner and outer flanges on a centrally positioned stem, with aligned slots being formed in the edges of the flanges to receive screws and a screwdriver for fastening the positioning tool to a workpiece. Alternatively the positioning tool may be temporarily fastened to a workpiece through the use of a strip of material having adhesive on opposite faces. After the workpieces have been fastened together, the positioning tool is removed from the first workpiece by the adhesive being softened through application of heat or a solvent.

14 Claims, 2 Drawing Sheets

WORKPIECE POSITIONING TOOL AND METHOD USING SAME

CROSS-REFERENCE TO A RELATED APPLICATION

Ser. No. 29/014,927—CORNER BRACE (Design)

BACKGROUND OF THE INVENTION

When two pieces are being fastened together in a right angle relationship, a right angle brace is typically used to hold the workpieces in a fixed relationship while being joined. A conventional brace, however, is only suitable for use where conditions are such that each of the workpieces can be clamped to the legs of the brace. There are numerous situations where this is not possible. An example is in adding shelves to a built-in bookcase. A clamp cannot be connected to the vertical end wall workpiece to hold the brace in a desired position to support the shelf while being fastened to the end wall. Another example is where one workpiece is to be connected in the center of a second workpiece at a substantial distance from the edges of the second workpiece. Clamps cannot be used since they cannot reach the brace. Thus, it is seen that a need exists for a more universal workpiece positioning tool.

SUMMARY OF THE INVENTION

The one-piece L-shaped positioning tool of this invention is "I" shaped in cross section and includes inner and outer oppositely disposed flanges with a centrally positioned stem portion interconnecting the flanges. The flanges include slots extending laterally inwardly from the outer edges. The slots in the inner and outer flanges are in alignment. This allows the positioning tool to be placed on screws fastened to one of the workpieces. A screwdriver can be inserted through the outer slot for engagement with the screw head, engaging the inner slot, to tighten the screws down and hold the tool firmly in place on a workpiece. The workpieces can be placed on either the inner or outer flanges of the tool.

In many situations it is unacceptable to use screws for holding the tool to a workpiece since they would leave an unsightly appearance when removed. An alternative to this, which does no damage to the workpieces, is to use a double adhesive tape between one leg of the positioning tool and one workpiece. Thus, using the example of the built-in bookcase, a vertical leg of the positioning tool is fastened to the vertical end wall of the bookcase by the adhesive tape. The shelf is placed on the horizontal leg of the positioning tool and screws are then used to fasten the shelf to the end wall of the bookcase. Neither adhesive or screws are needed to hold the shelf in place on top of the horizontal leg of the positioning tool. Obviously, however, either screws, adhesive or a clamp could be used if circumstances made it necessary. After the shelf has been screwed in place, the positioning tool needs to be removed and this is accomplished by using heat to soften the adhesive or by using solvent, which can be applied along the edge of the adhesive tape. The solvent will migrate across the entire area of the tape and release it from the tool and the end wall of the bookcase, leaving no scars.

Another problem this tool solves is where workpieces are being interconnected and the inside faces or surfaces of the positioning tool are used. The inside surfaces of the tool legs terminate in spaced relationship to form a recess at the corner juncture of the tool legs, thereby providing space for rough end edges of a workpiece such that a square relationship between the workpieces can be accomplished.

The positioning tool may be manufactured from any suitable material, such as aluminum, plastic or wood.

DESCRIPTION OF THE PREFERRED EMBODIMENT

Figure 1:
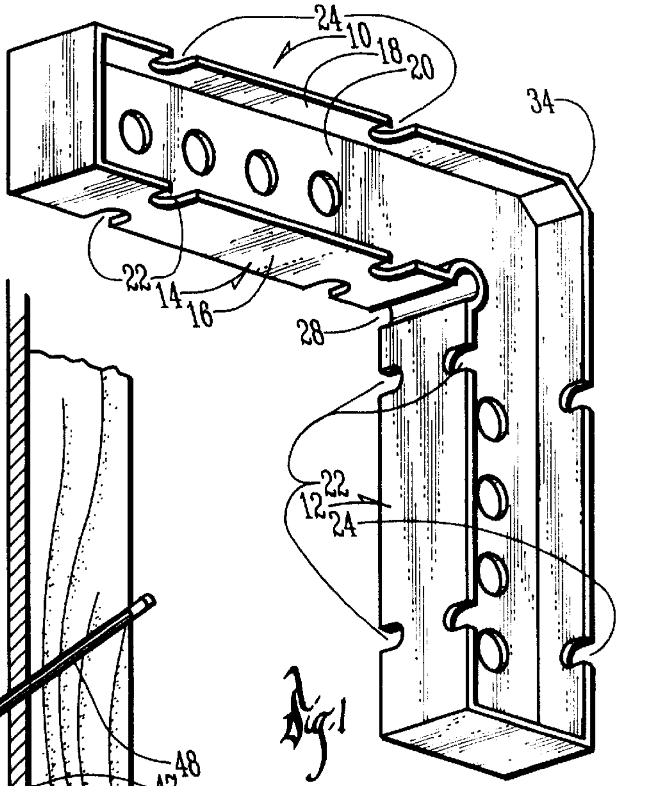
FIG. 1 is a perspective view of the positioning tool of this invention.

The positioning tool of this invention is referred to by the reference 10 in FIG. 1 and is seen to include a first leg 12 connected to a second leg 14 at a ninety degree angle. The tool 10 is of one piece construction and is I-shaped in cross section with inner and outer flanges, 16 and 18 respectively, provided on opposite sides of a centrally positioned stem 20. Flanges 16 and 18 include aligned slots 22 and 24 respectively for receiving a screw 26 and a screwdriver (not shown).

The inner flanges 16 at the juncture of the first leg 12 with the second leg 14 terminate short of each to form a recess 28. The recess 28 has an arcuate shape and will accommodate any excess material on a workpiece 30, as seen in FIG. 6, to allow for a smooth square relationship to be established with a second workpiece 32.

Figure 6:
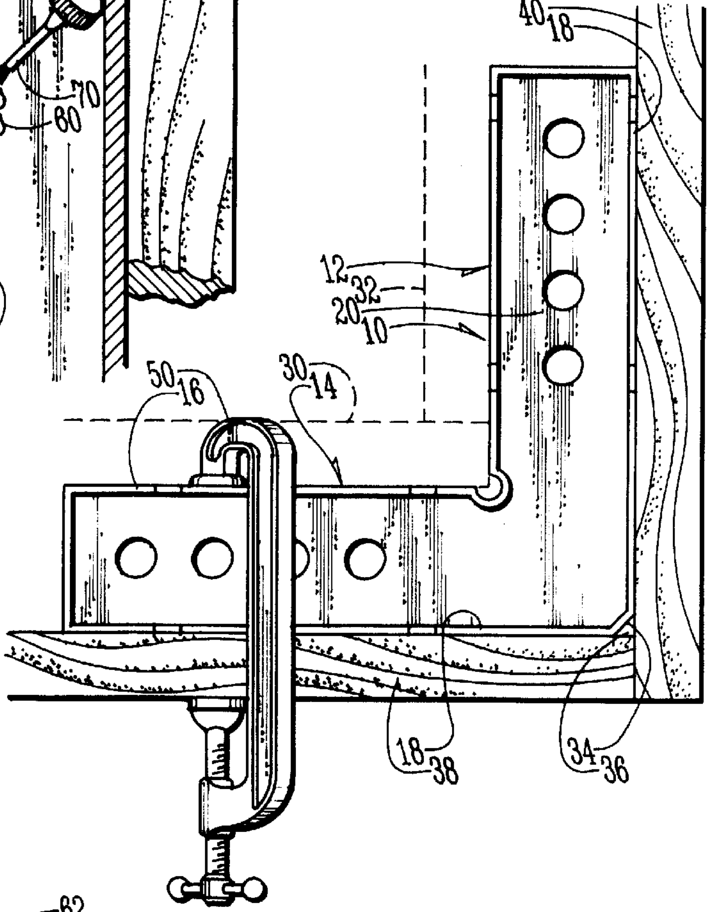
FIG. 6 is a side elevational view showing alternate uses of the positioning tool, including positioning the workpieces against the inner flanges of the positioning tool.

The outer flanges 18 on the first and second legs 12 and 14 are interconnected by a beveled flange portion 34 which forms a space 36 between workpieces 38 and 40 as seen in FIG. 6. Any excess material on the end of workpiece 38 will be accommodated in the space 36, thereby allowing for the desired ninety degree angle positioning of the workpieces 38 and 40.

The method of using the positioning tool 10 will now be described.

Figure 2:
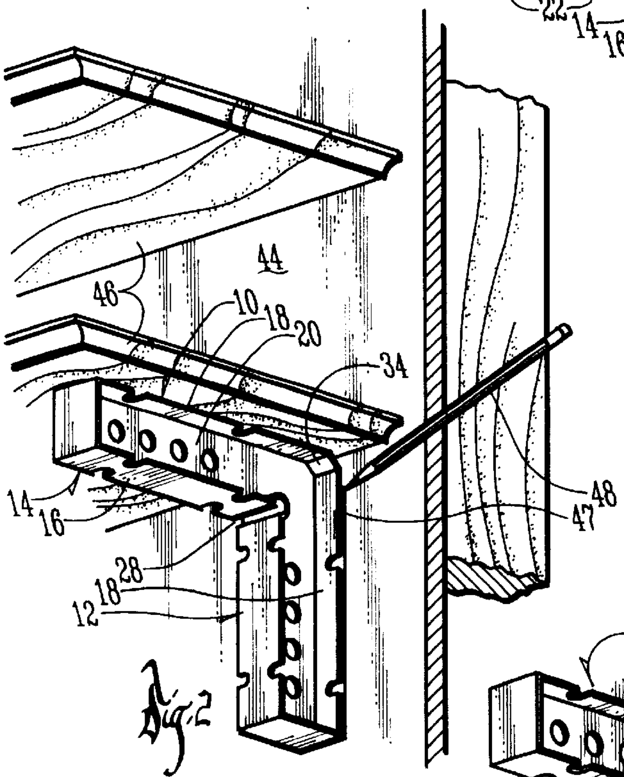
FIG. 2 is a fragmentary perspective view of the positioning tool being held temporarily in place against a pair of workpieces to be fastened together, such that positioning marks for the positioning tool can be inscribed on one of the workpieces.
Figure 3:
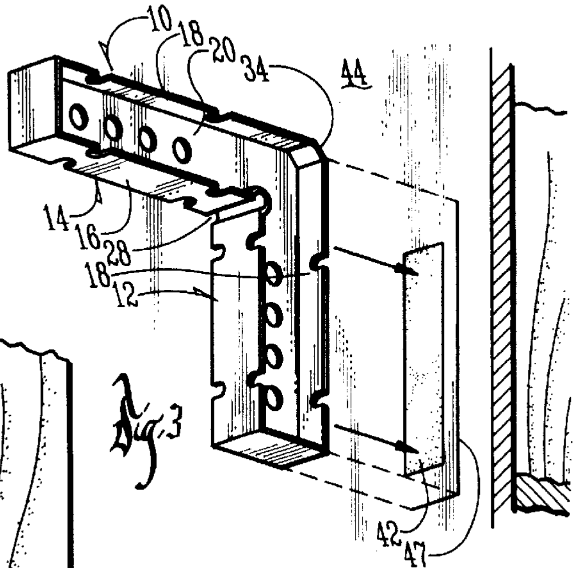
FIG. 3 is a fragmentary perspective view of the positioning tool being attached to a vertical workpiece by a strip of material having adhesive on opposite sides.
Figure 4:
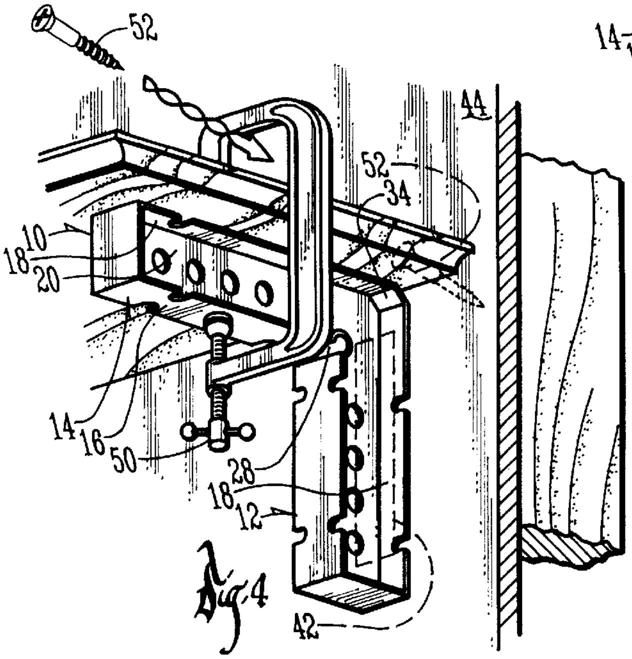
FIG. 4 is a view similar to FIG. 2, but showing the horizontal workpiece being fastened by screws to the vertical workpiece.

In FIGS. 2–5 a strip 42 having adhesive on both sides is applied to the outside surface of outer flange 18 of leg 12, which in turn is fastened to a vertical wall member workpiece 44. In FIG. 2 it is seen that the tool 10 is first temporarily positioned against the vertical workpiece 44 and under the horizontal workpiece shelf 46. When the desired positioning of the shelf 46 is obtained, markings 47 with a pencil 48 are provided on the workpiece 44 as seen in FIGS. 2 and 3. Next the strip 42 having double faced adhesive is used to fasten the leg 12 to the vertical end wall 44, followed by placing the shelf workpiece 46 on top of the horizontal leg 14. A clamp 50 may optionally be used to hold the workpiece shelf 46 to the leg 14. Screws 52 are then used to fasten the shelf workpiece 46 to the vertical wall workpiece 44 as seen in FIG. 4.

Figure 5:
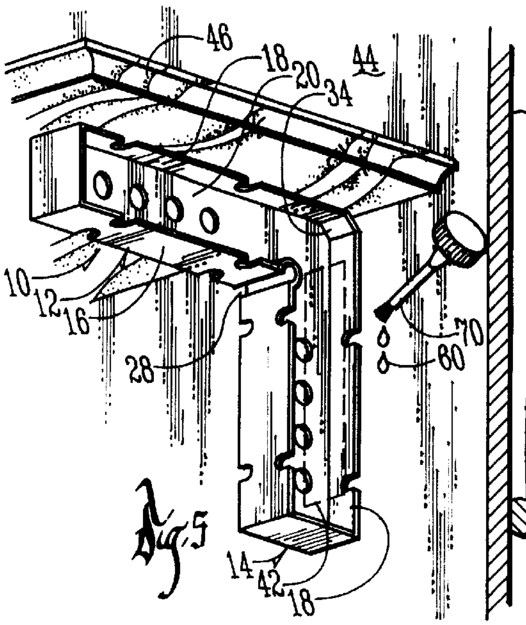
FIG. 5 is a view similar to FIGS. 2 and 4, but showing solvent being used to release the adhesive from the vertical workpiece and the positioning tool.

In FIG. 5 the positioning tool 10 is removed from the vertical end wall workpiece 44 by the application of solvent 60 to the adhesive on the strip of material 42. The solvent will soften the adhesive and cause it to release the positioning tool 10 without leaving any scars on the surface of the workpiece 44.

Figure 7:
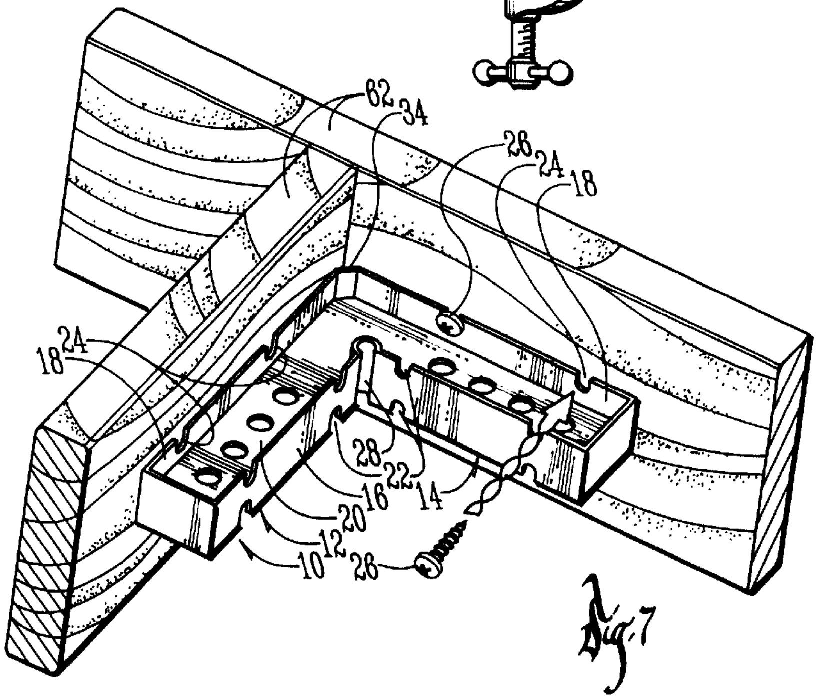
FIG. 7 is a fragmentary perspective view of the positioning tool being held in position on one workpiece through the use of screws.

As seen in FIG. 7, alternatively screws 26 can be used to fasten a first positioning tool leg 12 to a workpiece 62. The screws can be screwed into the workpiece 62 first and then the workpiece positioning tool mounted on the screw 26, or the positioning tool may be placed against the workpiece 62 and the screws 26 are screwed into the workpiece 62 at that time. The screwdriver will be positioned in one slot with the screw head being in the other slot of the aligned slots in the inner and outer flanges 16 and 18. The screws may be used in lieu of the strip of material 42 having double faced adhesive if the screw holes that are left after the positioning tool is removed do present an appearance problem.

As seen in FIG. 6, workpieces may be positioned along either the inner or outer flanges of the positioning tool.

The strip of material having double faced adhesive 42 may be carpet tape. The adhesive may be softened to cause it to release the positioning tool through the use of heat generated from a hand held hair dryer and gently pushing the tool from side to side. Adhesive residue can then be cleaned off the surface with common household cleaners. A solvent can be used to soften the adhesive and may be applied through use of a cloth or brush applicator 70 as seen in FIG. 5. Solvent will wick through the strip of material 42 to all areas of the adhesive. The solvent should be selected on the basis of what is compatible with the finished surface on the workpiece to which the tool 10 is to be attached, such that damage is not done to the surface. Solvents that are available to choose from include: Acetone, naphtha, lacquer thinner, mineral spirits and denatured alcohol.

What is claimed is:

1. A workpiece positioning tool comprising a one piece L-shaped member having first and second leg portions extending at right angles to each other, and said L-shaped member being I-shaped in cross-section and including a stem portion centrally disposed between oppositely disposed laterally extending inner and outer flanges, said inner and outer flanges of each of said first and second leg portions having flat surfaces being parallel to each other, each of said inner and outer flanges having oppositely disposed side edges with said stem portion being centered between said side edges, said flat surfaces of said inner flanges extending at right angles to each other and defining an open area there between, and said outer flanges on said first and second leg portions are interconnected by a beveled flange.

2. The workpiece positioning tool of claim 1 and said oppositely disposed laterally extending inner and outer flanges include aligned slots extending laterally inwardly from said side edges whereby a fastening element may be positioned in one slot and operated by a tool extending through the slot aligned with said one slot.

3. The workpiece positioning tool of claim 1 wherein said inner flanges on said first and second leg portions have adjacent ends which terminate in spaced apart relationship to form a recess therebetween.

4. The workpiece positioning tool of claim 1 wherein said outer flanges on said first and second leg portions have adjacent ends which terminate in spaced apart relationship.

5. The workpiece positioning tool of claim 1 wherein adhesive is provided on the flat surface of one of said inner and outer flanges for securing said tool to a workpiece.

6. The workpiece positioning tool of claim 1 wherein said flat surfaces on said inner and outer flanges on each of said first and second leg portions are continuously flat along their entire length for workpieces to be positioned at right angles to each other against said continuous flat surfaces of said inner and outer flanges.

7. The method of assembling a pair of workpieces in a right angle relationship including the steps of, providing a positioning tool comprising a one piece L-shaped member having first and second leg portions extending at right angles to each other, and said L-shaped member being I-shaped in cross-section and including a stem portion centrally disposed between oppositely disposed laterally extending inner and outer flanges, said inner and outer flanges of each of said first and second leg portions having flat surfaces being parallel to each other, each of said inner and outer flanges having oppositely disposed side edges with said stem portion being centered between said side edges, and said flat surfaces of said inner flanges extending at right angles to each other and defining an open area there between one of said flat surfaces including adhesive, positioning one leg with its inner or outer surface having adhesive against one of said pair of work pieces to hold it in a fixed relationship to said positioning tool, positioning the other of said pair of workpieces against the second leg portion of said tool, securing said other of said pair of workpieces to said second leg portion of said tool in a position relative to said first work piece such that said first and second workpieces can be directly fastened together, fastening said first and second workpieces directly together while secured to the first and second legs of said tool, and disconnecting said interconnected pair of workpieces from the first and second legs of said tool.

8. The method of claim 7 wherein said step of disconnecting said interconnected pair of workpieces from said first and second legs of said tool includes using a solvent on said adhesive connecting said one leg to said one workpiece.

9. The method of claim 7 wherein said step of disconnecting said interconnected pair of workpieces from said first and second legs of said tool includes applying heat to said adhesive connecting said one leg to said one workpiece.

10. The method of claim 7 wherein one of said inner or outer surfaces of said first and second leg portions having adhesive does so by a tape of double adhesive being applied between said one surface and said one of said pair of workpieces.

11. The method of assembling a pair of workpieces in a right angle relationship including the steps of, providing a positioning tool comprising a one piece L-shaped member having first and second leg portions extending at right angles to each other, and said L-shaped member being I-shaped in cross-section and including a stem portion centrally disposed between oppositely disposed laterally extending inner and outer flanges, said inner and outer flanges of each of said first and second leg portions having continuous flat surfaces being parallel to each other, each of said inner and outer flanges having oppositely disposed side edges with said stem portion being centered between said side edges, and said flat surfaces of said inner flanges extending at right angles to each other and defining an open area there between, positioning said first leg portion with its outer surface against one of said pair of work pieces, fastening said outer surface of said first of said tool to said one of said pair of workpieces to hold it in a fixed relationship to said positioning tool, positioning the other of said pair of workpieces against said outer surface of said second leg portion of said tool, securing said other of said pair of workpieces to said outer surface of said second leg portion of said tool in a position relative to said first workpiece such that said first and second workpieces can be directly fastened together, fastening said first and second workpieces directly together while secured to the first and said outer surface of said second legs of said tool, and disconnecting said interconnected pair of workpieces from said outer surface of said first and second leg portions of said tool.

12. The workpiece positioning tool of claim 11 wherein said step of fastening of said first leg portion of said tool to said one of said pair of workpieces is done by use of a clamp which engages said first leg portion of said tool and said one of said pair of workpieces.

13. The workpiece positioning tool of claim 12 wherein said step of fastening of said first leg portion of said tool to said one of said pair of workpieces is done by use of a screw which engages said first leg portion of said tool and said one of said pair of workpieces.

14. A workpiece positioning tool comprising a one piece L-shaped member having first and second leg portions extending at right angles to each other, and said L-shaped member being I-shaped in cross-section and including a stem portion centrally disposed between oppositely disposed laterally extending inner and outer flanges, said inner and outer flanges of each of said first and second leg portions having flat surfaces being parallel to each other, each of said inner and outer flanges having oppositely disposed side edges with said stem portion being centered between said side edges, said flat surfaces of said inner flanges extending at right angles to each other and defining an open area there between, and said oppositely disposed laterally extending inner and outer flanges on each leg portion including aligned slots extending laterally inwardly from said side edges whereby a fastening element may be positioned in one slot and operated by a tool extending through the slot aligned with said one slot.

* * * * *

UNITED STATES PATENT AND TRADEMARK OFFICE

CERTIFICATE OF CORRECTION

PATENT NO. : 5,855,073
DATED : January 5, 1999
INVENTOR(S) : Boelling

It is certified that error appears in the above-identified patent and that said Letters Patent is hereby corrected as shown below:

Title page,
Insert Item: -- Related U.S. Application Data,
[63] Continuation-in-part of Ser. No. 29/,104,927, Nov. 3, 1993, Pat. No. Des. 362,383 --.

Signed and Sealed this

Twenty-fifth Day of April, 2006

JON W. DUDAS
*Director of the United States Patent and Trademark Office*